Figure 1:
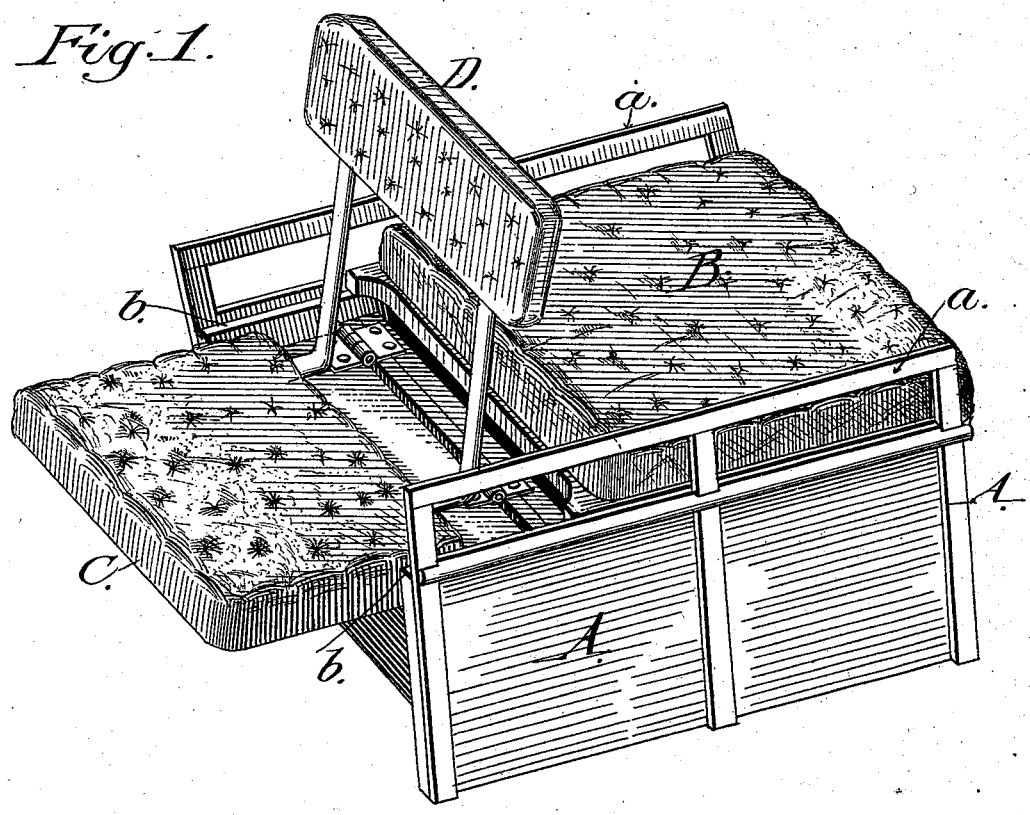

(No Model.)

C. M. BLYDENBURGH.
VEHICLE SEAT.

No. 380,170. Patented Mar. 27, 1888.

2 Sheets—Sheet 1.

WITNESSES.
T. Walter Fowler,
W. H. Patterson.

INVENTOR.
Chas. M. Blydenburgh,
per A. H. Evans & Co.
Attorneys.

(No Model.)  
2 Sheets—Sheet 2.
C. M. BLYDENBURGH.
VEHICLE SEAT.
No. 380,170.  
Patented Mar. 27, 1888.
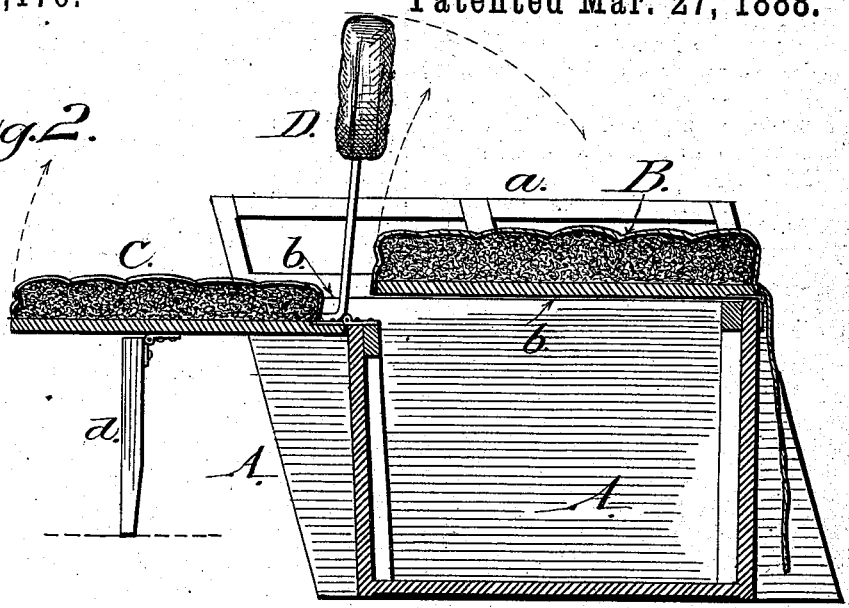
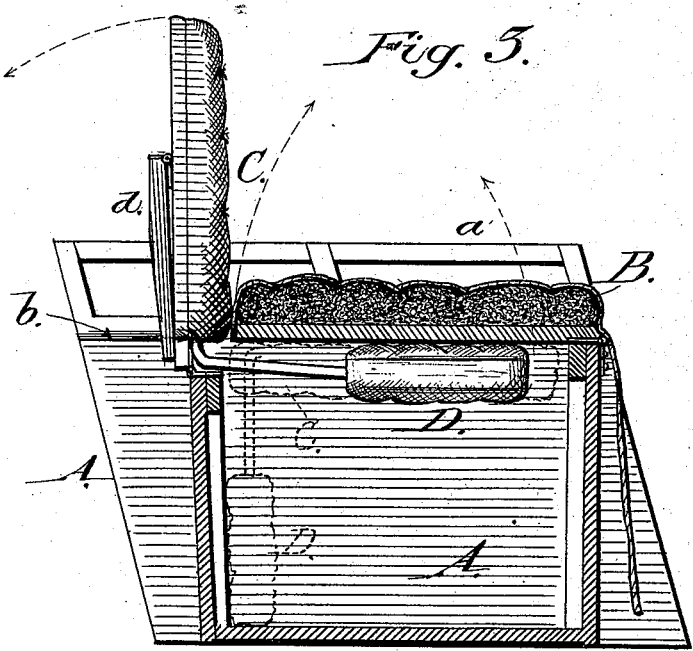
WITNESSES.  
T. Walter Fowler  
W. H. Patterson
INVENTOR.  
Chas. M. Blydenburgh  
per A. H. Evans & Co  
Attorneys.

UNITED STATES PATENT OFFICE.

CHARLES M. BLYDENBURGH, OF RIVERHEAD, NEW YORK.

VEHICLE-SEAT.

SPECIFICATION forming part of Letters Patent No. 380,170, dated March 27, 1888.

Application filed January 12, 1888. Serial No. 260,530. (No model.)

*To all whom it may concern:*

Be it known that I, CHARLES M. BLYDENBURGH, a citizen of the United States, residing at Riverhead, in the county of Suffolk and State of New York, have invented certain new and useful Improvements in Vehicle-Seats, of which the following is a full and clear description, reference being had to the accompanying drawings, forming part of this specification, in which—

Figure 1 represents a perspective view of a vehicle-body, showing the front and rear seats in position. Fig. 2 is a longitudinal sectional view of the same. Fig. 3 is a similar view showing the rear seat folded within the body portion.

My invention relates especially to that class of vehicles employing front and rear seats; and it consists in the constructions and combinations of devices which I shall hereinafter fully described and claim.

The object of my invention is to construct a vehicle that can be easily and quickly converted into a single or double seat vehicle, and when a single seat is used it will show no traces of its second seat.

To enable others skilled in the art to make and use my invention, I will now describe the same and indicate the manner in which I carry out the same.

In the said drawings, A represents the vehicle-body, constructed of any suitable material and provided with supporting-rails *a*, as shown in Fig. 1.

The side portions of the body A are formed on their inner sides with shoulders or cleats *b*, upon which the front seat is supported, and said body is so constructed that its walls constitute a receptacle into which the rear seat or its lazy-back may be folded when desired, as shown in Fig. 3.

The front seat, B, which may be suitably upholstered, is hinged or otherwise secured to the front portion or wall of the body A, so that it may be raised to an approximately vertical position to permit the introduction of the rear seat or its lazy-back into the chambered body, or to permit the withdrawal of said back or seat therefrom. This front seat may be a tufted seat, or, if preferred, it may be simply a removable cushion, and the seat portion proper may be removably connected with the body; but I prefer to hinge said portion to the body, as previously described, and cover its outer surface with some suitable tufted material.

The rear seat, C, is preferably hinged to the rear portion or wall of the body at such points between the side walls that said seat may be readily folded forward between said walls. This seat may by preference have connected with it the usual lazy-back, D, and when so constructed this back will assume a horizontal position when the seat C is raised to a vertical position. When constructed with a lazy-back and folded to the position shown in Fig. 3, the seat portion becomes the back for the front seat, the lazy-back in turn bearing against the under surface of the front seat and supporting the portion C in its new position.

If at any time I may wish to dispense with the front seat, I can use in lieu thereof the lazy-back, which, when the seat C is elevated to a vertical position, as shown in Fig. 3, may be utilized as a front seat. This, however, would only occur when the front seat, B, is omitted.

I do not wish to limit myself to any particular form of a seat or lazy-back, and I may dispense with the lazy-back or attach it to the front seat and arrange the rear seat so that it will fold entirely within the body A. Also, instead of moving from a horizontal to a vertical position, the said rear seat may be folded forward, so that its bottom portion will rest under the bottom of the front seat. Its lazy-back in this instance (if connected therewith) will come at rest against the rear wall of the body.

If found necessary the rear-seat portion may be provided with a folding or other support, *d*, which will assist in sustaining any weight upon the seat.

From this description it will seen that I am permitted to construct a vehicle with folding front and rear seats, and so construct the body and rear seat that the latter may not only be dispensed with as a seat, but may also serve as a back for the front seat, in which latter position, as before stated, its lazy-back will serve as the support for the seat and prevent the latter from falling backward.

Having thus described my invention, what I claim as new, and desire to secure by Letters Patent, is—

1. The combination, with a chambered body portion, of a front seat portion hinged to the front of said body and a rear seat portion hinged to the rear of the body and provided with a lazy-back adapted to enter the chambered body beneath the front seat, whereby the rear seat serves as a back for the front seat, substantially as described.

2. The chambered body A, having front, rear, and side walls, in combination with a rear seat hinged or jointed to the rear walls at points between its sides, whereby said seat may be folded forward, and a lazy-back connected to and movable with said rear seat, substantially as described.

3. The body A, having front, rear, and side walls, in combination with a rear seat hinged or jointed to said rear wall at points within or between the side walls, whereby said rear seat may be folded forward, and a front seat hinged or jointed to the front wall of the body, substantially as described.

4. The chambered body A, having the inner portions of its sides provided with shoulders or cleats, and a hinged front seat supported thereon, in combination with a rear seat hinged or jointed to the body within or between its sides, and a lazy-back movable with the rear seat and adapted to enter the chambered body beneath the front seat, whereby said rear seat is sustained when serving as a back for the front seat, substantially as described.

5. The body A and a rear seat hinged between its side walls, in combination with a folding or hinged support for said seat, substantially as described.

CHARLES M. BLYDENBURGH.

Witnesses:
T. WALTER FOWLER,
W. H. PATTERSON.